(12) United States Patent
Kottmann

(10) Patent No.: US 10,603,236 B2
(45) Date of Patent: Mar. 31, 2020

(54) MOTORIZED BEARING SURFACE TRANSPORTER FOR AN OPERATING TABLE SYSTEM

(71) Applicant: MAQUET GMBH, Rastatt (DE)

(72) Inventor: Heiko Kottmann, Rastatt (DE)

(73) Assignee: MAQUET GMBH, Rastatt (DE)

( * ) Notice: Subject to any disclaimer, the term of this patent is extended or adjusted under 35 U.S.C. 154(b) by 152 days.

(21) Appl. No.: 15/883,088

(22) Filed: Jan. 29, 2018

(65) Prior Publication Data

US 2018/0153755 A1 Jun. 7, 2018

Related U.S. Application Data

(63) Continuation-in-part of application No. PCT/EP2016/067136, filed on Jul. 19, 2016.

(30) Foreign Application Priority Data

Jul. 28, 2015 (DE) .................. 10 2015 009 816

(51) Int. Cl.
*A61G 13/06* (2006.01)
*B62B 3/02* (2006.01)
(Continued)

(52) U.S. Cl.
CPC .............. *A61G 13/06* (2013.01); *A61G 7/08* (2013.01); *A61G 13/104* (2013.01); *B62B 3/02* (2013.01);
(Continued)

(58) Field of Classification Search
CPC ...... A61G 13/06; A61G 2203/80; B62B 3/02; B62B 3/10; B62B 5/0033; B66F 9/00; B66F 9/06; B66F 9/07572
See application file for complete search history.

(56) References Cited

U.S. PATENT DOCUMENTS 4,750,579 A * 6/1988 Jarl .................... B60G 17/0272
                                                           180/209
6,772,850 B1    8/2004 Waters et al.
(Continued)

FOREIGN PATENT DOCUMENTS

CN        1836955 A    9/2006
CN      103359195 A    10/2013
(Continued)

OTHER PUBLICATIONS

International Search Report (with English translation) and Written Opinion dated Sep. 26, 2016 issued for PCT/EP2016/067136, 10 pages.
(Continued)

*Primary Examiner* — Tony H Winner
(74) *Attorney, Agent, or Firm* — Aaron M. Miller

(57) ABSTRACT

The present disclosure relates to a bearing surface transporter comprising an upper part for receiving an object to be transported, such as a patient bearing surface of an operating table, and a lower part. The lower part may comprise: at least three castors for manually moving the bearing surface transporter in any horizontal direction, at least one motorized drive wheel/roller, and a lowering mechanism for selectively lowering and raising the at least one drive wheel/roller relative to the castors, wherein the drive wheel (s)/roller(s) assume(s) an upper position for moving the bearing surface transporter manually and a lower position for moving the bearing surface transporter in a motorized manner. The lowering mechanism may have a pedal which can be actuated in an actuation direction, and the lowering mechanism may be designed such that a first actuation of the pedal in the actuation direction lowers the drive wheel(s)/roller(s) from the upper position into the lower position and that a second actuation of the pedal in the actuation direction
(Continued)

raises the drive wheel(s)/roller(s) from the lower position into the upper position.

21 Claims, 3 Drawing Sheets

(51) Int. Cl.
   *B62B 3/10* (2006.01)
   *B62B 5/00* (2006.01)
   *A61G 7/08* (2006.01)
   *A61G 13/10* (2006.01)
   *B60B 33/00* (2006.01)

(52) U.S. Cl.
   CPC .............. *B62B 3/10* (2013.01); *B62B 5/0033* (2013.01); *A61G 2203/80* (2013.01); *B60B 33/0042* (2013.01); *B60B 33/0068* (2013.01); *B60B 33/0092* (2013.01); *B62B 2202/42* (2013.01); *B62B 2206/003* (2013.01); *B62B 2206/06* (2013.01); *B62B 2301/044* (2013.01)

(56) References Cited

U.S. PATENT DOCUMENTS

| | | | | |
|---|---|---|---|---|
| 9,533,863 B2 * | 1/2017 | Plachta | ............... | B66F 9/07586 |
| 9,623,891 B2 * | 4/2017 | Newell | ................. | B62B 5/0033 |
| 10,315,900 B2 * | 6/2019 | Goncalves | .......... | B66F 9/07586 |
| 2003/0159861 A1 | 8/2003 | Hopper et al. | | |
| 2007/0137904 A1 * | 6/2007 | Rose | ..................... | B62B 3/0612 |
| | | | | 180/19.1 |
| 2013/0153840 A1 * | 6/2013 | Feiquan | .................. | B66F 9/065 |
| | | | | 254/2 R |
| 2015/0166314 A1 * | 6/2015 | Xu | .......................... | B66F 9/065 |
| | | | | 414/809 |
| 2017/0050832 A1 * | 2/2017 | Newell | ................. | B62B 3/0612 |
| 2018/0118543 A1 * | 5/2018 | Hoffman | ................. | B66F 9/065 |
| 2018/0334368 A1 * | 11/2018 | Pan | ..................... | B66F 9/07572 |
| 2019/0061796 A1 * | 2/2019 | Grinham | .................. | B62B 3/02 |

FOREIGN PATENT DOCUMENTS

| | | |
|---|---|---|
| CN | 103800161 A | 5/2014 |
| CN | 103800162 A | 5/2014 |
| CN | 204077833 U | 1/2015 |
| DE | 202006018055 U1 | 3/2007 |
| DE | 102009020395 A1 | 11/2010 |
| WO | 2014/184764 A1 | 11/2014 |

OTHER PUBLICATIONS

Chinese Office Action and Chinese Search Report (with English translations) dated Aug. 5, 2019 during the prosecution of corresponding Chinese Patent Application No. 201680052878.7, 19 pages.

* cited by examiner

MOTORIZED BEARING SURFACE TRANSPORTER FOR AN OPERATING TABLE SYSTEM

CROSS REFERENCE TO RELATED APPLICATIONS

The present application is a continuation-in-part filed under 35 U.S.C. § 111(a), and claims the benefit under 35 U.S.C. § 365(c) of PCT International Application No. PCT/EP2016/067136, filed Jul. 19, 2016, which designates the United States of America, and claims the benefit of German Patent Application No. 10 2015 009 816.0, filed Jul. 28, 2015. The disclosure of each of these applications is incorporated by reference herein in its entirety.

TECHNICAL FIELD

Embodiment of the present disclosure relate to a patient bearing surface transporter, and for instance may relate a patient bearing surface transporter for an operating table.

BACKGROUND

With operating tables, it is common that a bearing surface for supporting a patient is detachably mounted on an operating table base, and that for the transportation of the bearing surface and the patient, a motorized bearing surface transporter can be used. Such a bearing surface transporter typically includes an upper part for receiving the bearing surface of the operating table and a lower part with rollers for moving the bearing surface transporter.

For this, typically, four sets of castor wheels, such as double castor wheels are used, so that the bearing surface transporter can be moved longitudinally and transversely to the direction of travel. If the bearing surface transporter must be moved straight forward over a longer distance, a stabilizing additional roller wheel is necessary. This additional roller wheel guarantees the directional stability and prevents the bearing surface transporter from drifting away when negotiating a curve. This additional roller wheel must be pressed with a defined force onto the floor or surface in order to prevent slipping when negotiating a curve. However, if the user wishes to move the transporter in a direction transverse to the direction of travel, it must be possible to raise the additional roller wheel from the floor again.

This lowering and raising of this additional roller wheel is typically done by means of a foot pedal, in that pressure from above exerted downwards presses the pedal downward, thereby loading a spring or a gas spring, which in turn transmits its force via a lever mechanism or a Bowden wire cable to a suspension mechanism of the additional roller wheel, thereby pressing the additional roller wheel onto the floor surface. If the additional roller wheel is to be raised again, the pedal is pulled upwards with a toe movement and the additional roller wheel is lifted off the floor. The upwards pull of the pedal with the toe is more difficult to perform for the user from an ergonomic point of view than the actuation of the pedal by exerting pressure from above (i.e., downwards).

Customary bearing surface transporters must be pushed manually, sometimes with the patient lying on them. This means that sometimes a total mass of up to 630 kg must be moved.

It is therefore an objective of the embodiments of the present disclosure to provide a bearing surface transporter that is particularly easy for traveling straight forward over longer distances, and which can also be maneuvered in any other horizontal direction for short distances. Another objective of the embodiments of the present disclosure is to provide a frame for the transportation of loads that can be easily and efficiently moved, motorized as well as manually.

SUMMARY OF THE DISCLOSURE

These objectives maybe accomplished with a bearing surface transporter as described in the present disclosure. The bearing surface transporter may have an upper part for receiving an object to be transported, such as a bearing surface of an operating table, and a lower part. The lower part may have for instance at least three castors (such as double castors) for manually moving the bearing surface transporter in any horizontal direction, at least one motorized drive wheel/drive roller, and a lowering mechanism for selectively lowering and raising the at least one drive wheel/roller relative to the double castors, the drive wheel (s)/roller(s) occupying an upper (raised) position for manually moving the bearing surface transporter and a lower position for operating the bearing surface transporter manually and using a motor. In the upper (raised) position of the drive wheel(s)/roller(s), the bearing surface transporter can therefore be easily moved in any desired direction by means of the double castors, whereas in the lower position, the drive wheel(s)/roller(s) may exert a driving force onto the ground to thrust and otherwise propel the bearing surface transporter. Furthermore, the drive wheel(s)/roller(s) in the lower position can stabilize the directional stability of the bearing surface transporter, and prevent drifting when negotiating curves.

The lowering mechanism may encompass a pedal that can be actuated in an actuation direction, meaning that the pedal is actuated, for instance by being pressed downwards. The lowering mechanism may be designed such that a first actuation of the pedal in the actuation direction lowers the at least one drive wheel/roller from the upper (raised) position to the lower position and that a second actuation of the pedal in the actuation direction raises the at least one drive wheel(s)/roller from the lower to the upper position. This allows a user to adjust both the upper and the lower position of the drive wheel(s)/roller(s) by repeatedly pressing the pedal downward, without the user having to perform difficult and ergonomically inconvenient movements, such as raising the pedal through the application of an upwards force with his or her foot.

According to some embodiments of the present disclosure, the lowering mechanism may be provided such that it comprises at least one torsion spring such as a torsion bar spring, which exerts a force on the drive wheel(s)/roller(s) in the lower position of the drive wheel(s)/roller(s) in the direction of the ground under the bearing surface transporter. This can prevent a spinning of the drive wheel(s)/roller(s) when driving the bearing surface transporter. Here, the pedal can be attached to the at least one torsion spring such that an actuation of the pedal in the actuation direction torques the torsion spring. Thus, the torsion spring can be tensioned by the actuation of the pedal, wherein it is possible to increase the force with which the torsion spring presses the drive wheel/roller against the ground by pressing the pedal.

According to some embodiments, the lowering mechanism may comprise a cam disk and guide pin held in a groove or slot in the cam disk, the guide pin (or cam follower) moving along a closed path or slot between a starting position and a locking position upon the actuation of the pedal. Thus, the cam disk and the guide pin can ensure that in case of successive actuations of the pedal in the same actuation direction, the position of the guide pin alternates between the starting position and the locking position. The starting position of the guide pin may be assigned to the upper (raised) position of the drive wheel(s)/roller(s), and the locking position of the guide pin may be assigned to the lower position of the drive wheel(s)/roller(s). In other arrangements, the starting position of the guide pin may be assigned to the lower position of the drive wheel(s)/roller(s) and the locking position of the guide pin may be assigned to the raised/upper position of the drive wheel(s)/roller(s).

Upon a first actuation of the pedal in the actuation direction, the guide pin can be moved along a first path from the starting position to a first stop, and from there to the locking position. For instance, it may be provided that the first actuation of the pedal moves the guide pin from the starting position to the first stop, and that upon the weakening of the force exerted by a user on the pedal, the guide pin then moves from the first stop to the locking position. Furthermore, upon a second actuation of the pedal in the actuation direction, the guide pin can be moved along a second path from the locking position to a second stop, and from there to the starting position. It may be provided, for instance, that the second actuation of the pedal moves the guide pin from the locking position to the second stop, and that upon the weakening or lessening of the force exerted by the user on the pedal, the guide pin moves from the second stop to the starting position. If the lowering mechanism comprises at least one torsion spring, it can be tensioned or torqued during the movement of the guide pin from the starting position to the first stop, and be released during the movement from the second stop to the starting position.

According to some embodiments it may be provided that the at least one drive wheel/roller is fastened to an associated rocker, the drive wheel(s)/roller(s) being capable of being pivoted by the rocker from the upper (raised) position to the lower position and vice versa. A spring (such as a torsion spring) may be tensioned between the rocker and the lower part of the bearing surface transporter such that it exerts a force in the direction of the upper position of the drive wheel/roller. This ensures that the drive wheel(s)/roller(s) are reliably returned to the upper position when the bearing surface transporter is to be manually maneuvered in different directions.

According to some embodiments, it may be provided that the drive wheel(s)/roller(s) are not attached flexibly to the lower part, so that the angle between the axis (axes) of the drive wheel(s)/roller(s) and, for instance, a longitudinal beam of the lower part is constant. Such rigid drive wheels/rollers which, like the double castors, touch the ground, provide directional stability to the bearing surface transporter and prevent the bearing surface transporter from drifting when negotiating curves. According to some embodiments, it may be provided that the at least one drive wheel/roller include a brushless external rotor motor. This allows for the realization of a particularly compact drive, in which the rotor can directly take over the function of the wheel rim.

According to some embodiments, at least two drive wheels/rollers can be provided that are pressed against the ground when they are in their lower position by means of at least two spring elements, each drive wheel/roller being assigned its own spring element. Thus, uneven floors and thresholds can be negotiated, as the drive wheels/rollers move individually up or down, sufficient pressure onto the ground being ensured by the spring elements during the movement. This allows for the bearing surface transporter to be moved by motor even over an uneven ground, without a drive wheel/roller losing contact with the ground or starting to spin due to a low contact pressure.

Another aspect of certain embodiments of the present disclosure relates to a system comprising an operating table having a bearing surface detachably mounted on a base, as well as a bearing surface transporter as described above. Such a system allows for pre- and post-operative repositioning of a patient, the patient being allowed to remain on the bearing surface of the operating table.

Yet another aspect of certain embodiments of the present disclosure relates to a roller wheel/drive for a frame for the transportation of loads, comprising at least three double castors for manually moving the frame in any lateral direction, at least one motorized drive wheel/roller and a lowering mechanism for selectively lowering and raising the at least one drive wheel/roller relative to the double castors, the drive wheel(s)/roller(s) occupying an upper position for manually moving the frame and a lower position for moving the frame in a motorized manner (e.g., a motorized assist manner). This allows for the moving of heavy loads by a user, because on the one hand, the double castors allow for the maneuvering of the frame in any directions within a confined space, whereas the motorized drive wheel/roller also allows for the transportation of the frame over longer distances with only a small effort by the user.

The lowering mechanism is presented in certain embodiments to include a pedal that can be actuated in an actuation direction, meaning that the pedal can be actuated, for instance, by pressing it downward. The lowering mechanism is designed such that a first actuation of the pedal in the actuation direction lowers the drive wheel(s)/roller(s) from the upper to the lower position and that a second actuation of the pedal in the actuation direction raises the drive wheel(s)/roller(s) from the lower position to the upper position. This allows a user to set either the upper or the lower position of the drive wheel(s)/roller(s) by repeatedly pressing the pedal downward without having to perform difficult and ergonomically inconvenient movements, such as raising the pedal with his foot.

BRIEF DESCRIPTION OF THE DRAWINGS

Exemplary embodiments of the present invention are described below with reference to the appended drawings, in which specific reference characters designate the respective identical or corresponding elements.

DETAILED DESCRIPTION

Figure 1:
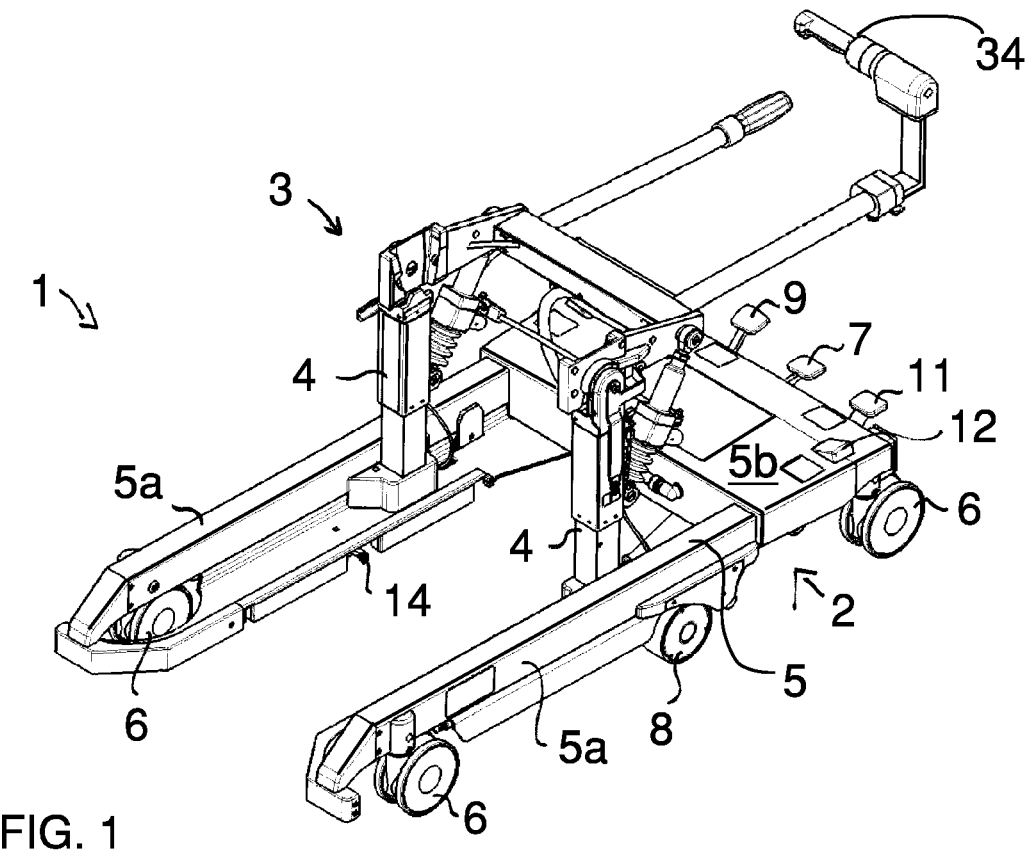
FIG. 1 shows a perspectival view of a lower part of a bearing surface transporter according to an embodiment of the present disclosure.

For illustrative purposes, the principles of the present invention are described by referencing various exemplary embodiments. Although certain embodiments of the invention are specifically described herein, one of ordinary skill in the art will readily recognize that the same principles are equally applicable to and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. It must be noted that as used herein and in the appended claims, the singular forms "a". "an", and "the" include plural references unless the context clearly dictates otherwise. As well, the terms "a" (or "an"), "one or more" and "at least one" can be used interchangeably herein. It is also to be noted that the terms "comprising," "including," "composed of," and "having" can be used interchangeably. In the following description, exemplary embodiments of the present invention will be described with reference to the drawings. The drawings are not necessarily made to scale: they are merely intended to schematically illustrate the respective characteristics.

It should be noted that the characteristics and components described below may all be combined with each other, regardless of whether they have been described in the context of a single embodiment. The combination of characteristics in the respective embodiments is merely meant to illustrate the basic structure and operation of the claimed device.

A bearing surface transporter 1 according to one embodiment is essentially composed of a combination of a lower part or lower portion 2 and an upper part or upper portion 3. The upper part 3 is designed such that it can receive a bearing surface of an operating table in order to transport the bearing surface and the patient supported on it to a desired location. The upper part may have a handle 34 that facilitates control of the bearing surface transporter 1. The individual components and functions of the upper part 3 are not further described here.

Figure 2:
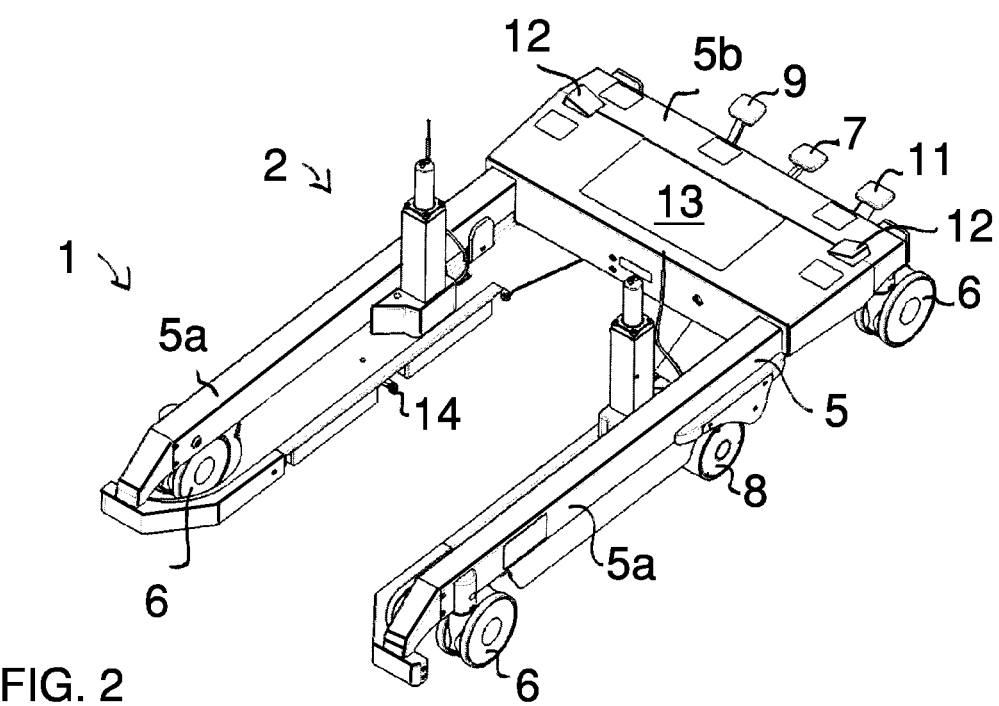
FIG. 2 shows a view of the components of the lowering mechanism of the bearing surface transporter shown in FIG. 1.

FIG. 2 shows a lower part 2 of such a bearing surface the transporter 1, which comprises a frame 5 which consists in the example shown of two longitudinal beams 5a and a crosshead 5b. In order to manually move the bearing surface transporter 1 in any lateral direction along the ground surface, a plurality of double castors 6 are provided. In the embodiment shown in FIGS. 1 and 2, four double castors 6 are mounted on the frame 5, but alternatively it is also possible to provide three, five, six, or even more double castors 6. On the frame 5, a pedal 7 may be mounted for selectively locking and releasing the double castors 6 in order to fixate the bearing surface transporter 1 in a desired position.

Figure 3:
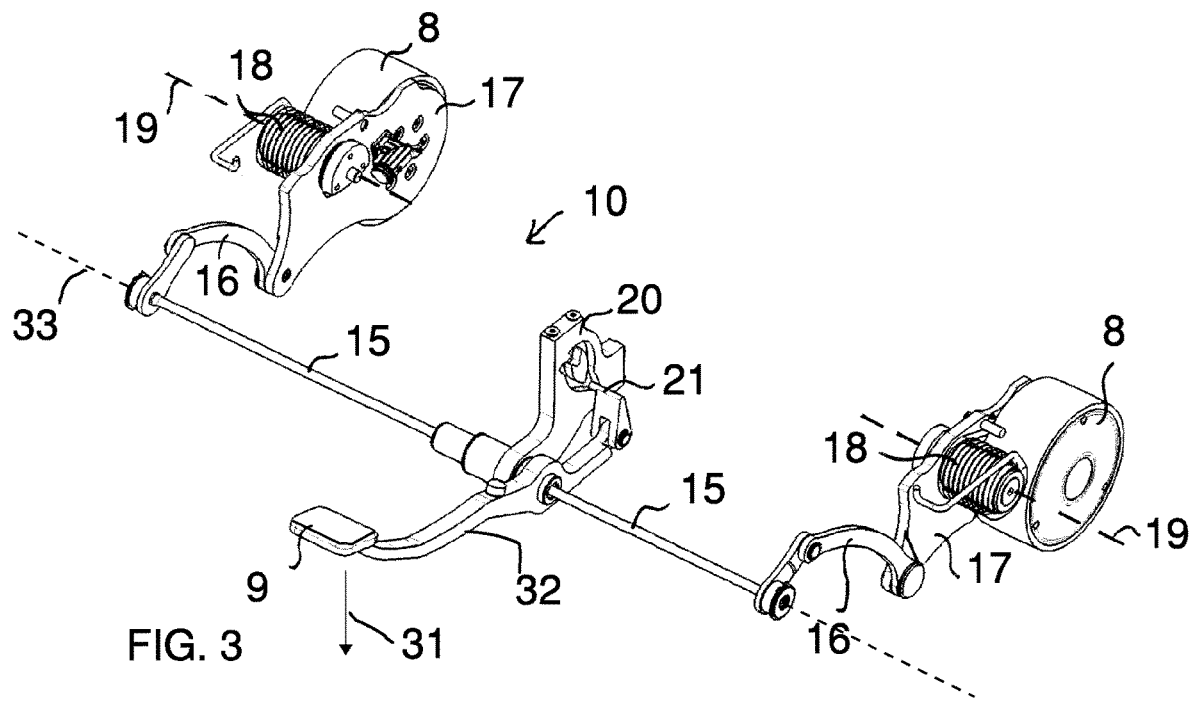
FIG. 3 shows a view of a detail of the lowering mechanism of the bearing surface transporter shown in FIG. 1.
Figure 4:
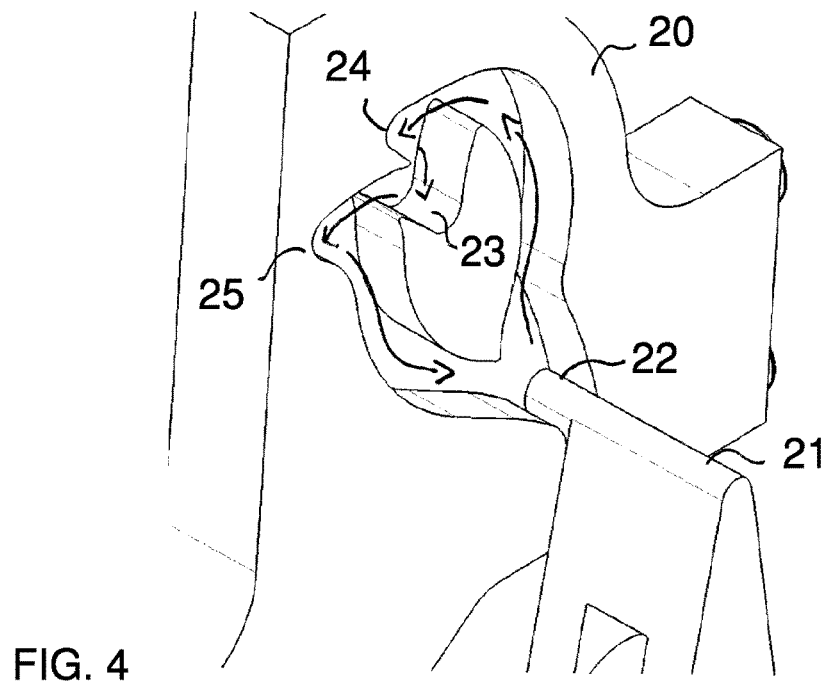
FIG. 4 shows an enlarged detail view of the cam disk shown in FIG. 3.
Figure 5:
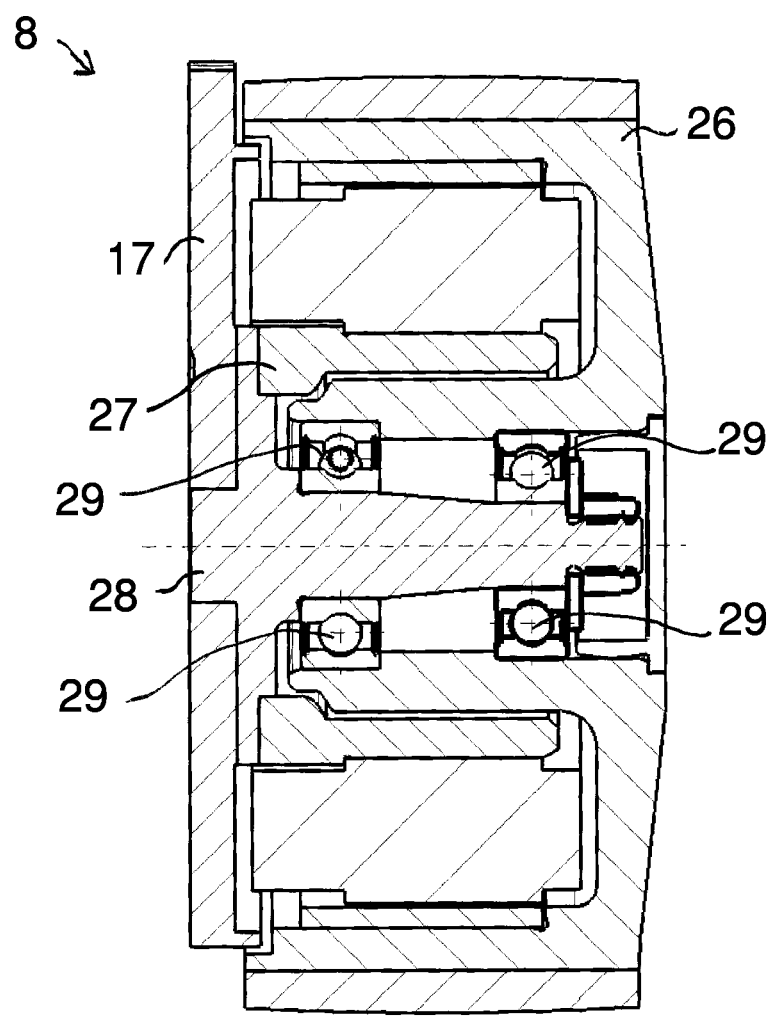
FIG. 5 shows a schematic cross-sectional view of a drive wheel/roller according to an embodiment of the present invention.

In the embodiment shown in FIGS. 1 and 2, two motorized drive wheels/rollers 8 are provided on the frame 5, which can be lifted from the floor or pushed against the floor, respectively, by means of a manually actuated pedal 9 and a lowering mechanism 10 (see FIGS. 3 and 4). According to other embodiments of the present disclosure, it is possible that instead of the two drive wheels/rollers 8 shown here, only one single drive wheel/roller, or more than two drive wheels/rollers may be provided.

Furthermore, a pedal 7 for the height adjustment of the upper part 3 of the bearing surface transporter 1 with respect to the lower part 2 may be provided on the frame 5, for instance by use of a hydraulic lift mechanism 4 and a pump actuated by the pedal 7, and two foot switches 12 for a pre- or postoperative bearing surface transfer and a control unit 13 may be incorporated on or in the crosshead 5b of the frame 5.

In the following, an example embodiment of the lowering mechanism 10 for the drive wheels/rollers 8 is explained with reference to FIGS. 3 and 4. The lowering mechanism 10 may be actuated by pressing the pedal 9 downward (such as via directional arrow 31 that is generally perpendicular to the ground surface), that is, both the lowering and the raising of the drive wheels/rollers 8 are achieved by means of the actuation of the pedal 9 in the respective same direction, which in the shown embodiment by pressing the pedal 9 downward. For the actuation of the pedal 9 by pressing downward from above, a mechanism was developed which emulates a principle akin to that of a ballpoint pen, in which it is possible to achieve two different positions of the lowering mechanism 10 by providing a force against an actuator such as a pedal 9.

The lowering mechanism 10 as drawn comprises a torsion bar spring 15 to which the pedal 9 is attached, the mechanism being connected with a rocker 17 via a respective lever or linkage 16. At the other end of the rocker 17, a respective drive wheel/roller 8 is mounted. On the axis of rotation 19 of the rocker 17, a torsion or leg spring 18 is arranged such that it holds the drive wheel/roller 8 in its raised position.

Furthermore, the lowering mechanism 10 comprises a cam disk 20 attached to the frame 5 of the lower part 2, as well as a guide pin 21 (such as a cam follower pin) attached to an opposite end of the crank arm 32 that connects the pedal 9 to the guide pin 21 end. The guide pin is guided along a closed path (i.e., slot) in the cam disk 20 upon the actuation of the pedal 9. As shown in FIG. 4, the path in the cam disk 20 defines a first position or location 22 of the guide pin 21 in which the drive wheels/rollers 8 are lifted from the ground, thus allowing the bearing surface transporter 1 to be manually moved in all lateral directions, preferably without interference from ground contact of the drive wheels/rollers 8. Upon the actuation of the pedal 9, the guide pin 21 follows the cam slot along the path marked by arrows in FIG. 4 and reaches a second position or location 23 in which the guide pin 21 is held in a depression. In this second position 23 of the guide pin, the torsion bar spring 15 via the respective lever 16 or linkage, the rocker 17 is rotated about its axis 19 such that the drive wheels/rollers 8 are lowered and reach the floor or ground surface.

Thus, according to the present embodiment, the lowering mechanism 10 functions through the cooperation of the torsion bar spring 15 which generates the pressing force with the cam disk 20, by way of which the two positions of the drive wheels/rollers 8 are made possible.

In the following, the function of the lowering mechanism 10 according to the embodiment shown in FIGS. 2 to 4 will be described step by step:

a. For lowering and pressing the drive wheels/rollers 8 against the ground surface, the user actuates the pedal 9, and thus moves the rockers 17 with the drive wheels/rollers 8 mounted on it via the torsion bar spring 15 and the lever 16 toward the ground. At the same time, the guide pin 21 at the other end of the pedal crank arm 32 moves inside the cam disk in the direction of the position 24 of the first stop.

b. While the drive wheels/rollers 8 pivot with their respective rockers 17 on the ground, the torsion (or leg) springs 18 are tensioned on the rocker axes 19, thereby allowing a pivoting back of the drive wheels/rollers 8.

c. When the drive wheels/rollers 8 have reached the ground and the user pushes the pedal 9 further, the two torsion springs 15 are torqued until the guide pin 21 has reached the first stop 24 in the cam disk 20.

d. If the user then takes their foot off the pedal 9, the torsional stress moves the pedal 9 back again by an acute angle, such that the guide pin 21 is moved into the locking position 23 and is held in it. In this position, the drive wheels/rollers 8 are pressed with a defined force per roller onto the ground, and the automatic driving mode in which the bearing surface transporter is moved by the drive wheels/rollers 8, becomes possible.

e. If the drive wheels/rollers 8 are now to be pivoted back up in order to allow the bearing surface transporter 1 to manually maneuver in different directions (and without interference of the drive wheels/rollers 8, the user will depress the pedal 9 again, thus moving the guide pin 21 against the second stop 25.

f. When the user takes their foot off the pedal 9, the torsion bar springs 15 are released and move the pedal 9 upwards and the guide pin 21 towards the starting position 22.

g. If the torsion springs 15 are completely released while the drive wheels/rollers 8 are still on the ground, the torsion (or leg) spring 18 tensioned in step b. swings the rocker 17 with the drive wheel/roller 8 attached to it upwards until the guide pin 21 has reached the starting position 22 in the guide groove of the cam disk 20.

The mechanism as shown in the example embodiment makes it is possible to actuate the pedal 9 only from above, thereby selectively either raising the drive wheels/rollers 8 or lowering them such that they are pressed against the ground in order to allow a power transmission of the drive mechanism. The torsion bar spring 15 generates the force that is necessary in order to prevent the slipping or spinning of the drive wheels/rollers 8 on the ground. The user does therefore not have to push the bearing surface transporter 1 manually, but may move the transporter in a motorized manner, if needed, and thus move it very efficiently, either forward, backward, or along a curve.

In the embodiment shown in FIG. 1-4, the two motorized drive wheels/rollers 8 are respectively mounted on a pivoting rocker 17 underneath the two side beams 5a of the frame 5, thereby allowing for automatic and slip-resistant driving. The lowering mechanism 10 located below the crosshead of the frame 5 and which is actuated by the pedal 9 allows for the following two positions of the drive wheels/rollers 8:

1. Position: The drive wheels/rollers 8 are rotated upward (and thereby raised), such as to not rest on the ground surface, thereby allowing for a manual transverse movement of the bearing surface transporter 1, for example by use of the castor wheels 6 only in all lateral directions permitted by the castor wheels.

2. Position: The drive wheels/rollers 8 are pressed onto the ground with a certain force in order to prevent slippage of the drive wheels/rollers during the motorized movement of the bearing surface transporter 1, such that motorized propulsion through the drive wheels can occur.

In the illustrated embodiment, two torsion bar springs 15 may be provided, in which each drive wheel/roller 8 may be pressed against the ground by its own respective torsion bar spring 15. This ensures that the two drive wheels/rollers 8 can move up and down independently of each other in order to compensate for uneven floors, while the pressing force of the drive wheel/roller 8 against the ground continues to be provided by the corresponding torsion spring 15. This can be achieved by way of an appropriate design (a characteristic curve) of the torsion bar springs 15. Elevator thresholds may thus be compensated or negotiated as well without disrupting performance.

FIG. 4 shows a schematic sectional view of a motorized drive wheel/roller 8. In one embodiment, the drive wheels/rollers 8 may each be brushless external rotor motors in which the rubberized rotor 26 assumes the function of the wheel rim. A stator carrier 27 and an axel 28 are bolted to the rocker 17 and contain the winding or the bearings 29 for the rotor 26, respectively.

With this highly integrated structure, it is possible to realize a motorized drive wheel/roller 8 with a very space-saving drive and format.

The foregoing description of embodiments of the present disclosure is presented for the purpose of illustration and description only, and is not to be construed as limiting the scope of the invention in any way. It is intended that the specification and the disclosed examples be considered as exemplary only, and that the examples not be limiting on the disclosure.

The invention claimed is:

1. A bearing surface transporter comprising an upper part for receiving a patient bearing surface of an operating table, and a lower part, the lower part comprising:
   a frame;
   at least three castors configured for manually moving the bearing surface transporter via wheeled transport in any lateral direction, the at least three castors connected to the frame;
   at least one motorized drive wheel/roller, and;
   a lowering mechanism for selectively lowering and raising the at least one drive wheel/roller relative to the castors;
   wherein the at least one drive wheel/roller may assume a raised position for manually moving the bearing surface transporter and a lower position for moving the bearing surface transporter in a motorized manner through propulsion contributed to by the drive wheel/roller, and
   wherein the lowering mechanism comprises a pedal that can be actuated in an actuation direction, and in which the lowering mechanism is configured such that a first actuation of the pedal in the actuating direction lowers the at least one drive wheel/roller from the raised position to the lower position and that a second actuation of the pedal in the actuating direction raises the at least one drive wheel/roller from the lower position to the raised position.

2. A bearing surface transporter according to claim 1, wherein the lowering mechanism comprises at least one spring which, when the at least one drive wheel/roller is in the lower position, exerts a force onto the at least one drive wheel/roller in a direction of a ground surface underneath the bearing surface transporter to permit a rotational torque applied to the at least one drive wheel/roller to propel the bearing surface transporter.

3. A bearing surface transporter according to claim 2, wherein the pedal is attached to at least one torsion bar spring such that an actuation of the pedal in the actuation direction applies torque to the torsion bar spring.

4. A bearing surface transporter according to claim 1, wherein the lowering mechanism comprises a cam disk having a groove and a guide pin for guided movement in the groove of the cam disk, wherein the guide pin moves along a closed path between a starting position and a locking position when the pedal is actuated.

5. A bearing surface transporter according to claim 4, wherein upon the first actuation of the pedal in the actuation direction, the guide pin is moved along a first path from the starting position to a first stop and from there to the locking position, and upon the second actuation of the pedal in the actuation direction, the guide pin is moved along a second path from the locking position to a second stop and from there to the starting position.

6. A bearing surface transporter according to claim 1, wherein the at least one drive wheel/roller is fastened to a respective rocker, and in that a spring is arranged between the rocker and the lower part of the bearing surface transporter to exert a force in the direction of the raised position of the drive wheel/roller.

7. A bearing surface transporter according to claim 6, wherein the spring is a torsion spring or leg spring.

8. A bearing surface transporter according to claim 1, wherein the at least three castors are attached to the lower part and permitted to rotate about a vertical axis of rotation.

9. A bearing surface transporter according to claim 1, wherein the at least three castors are double castors, and the at least three castors are configured to rotate about a vertical axis of rotation.

10. A bearing surface transporter according to claim 1, wherein the at least one drive wheel/roller is attached to the lower part and is at least partially restricted from rotating with respect to the frame about a vertical axis of rotation.

11. A bearing surface transporter according to claim 1, wherein the at least one drive wheel/roller is attached to the lower part and is restricted from rotating with respect to the frame about a vertical axis of rotation.

12. A bearing surface transporter according to claim 1, wherein the at least one drive wheel/roller is driven by a brushless external rotor motor.

13. A bearing surface transporter according to claim 1, wherein the at least one drive wheel/roller comprises at least two drive wheels/rollers, and when in their lower position, the at least two drive wheels/rollers are pressed against the ground by at least two springs, each of the at least two drive wheels/rollers being assigned to one of the at least two springs.

14. A bearing surface transporter according to claim 13, wherein the at least two springs are torsion bar springs.

15. A bearing surface transporter according to claim 1, wherein the actuation direction is a downward direction.

16. A roller drive for a frame for the transportation of loads, the roller drive comprising:

at least three castors for manually moving the frame in any direction lateral direction through use of the at least three castors;

at least one motorized drive wheel/roller;

a lowering mechanism for selectively lowering and raising the at least one drive wheel/roller relative to the castors, wherein the at least one drive wheel/roller may assume a raised position for manually moving the frame without assistance of a motorized propulsion and a lower position for moving the frame through the use or assistance of the motorized propulsion;

wherein the lowering mechanism comprises a pedal that can be actuated in an actuating direction, and in which the lowering mechanism is configured such that a first actuation of the pedal in the actuating direction lowers the at least one drive wheel/roller from the raised position to the lower position and that a second actuation of the pedal in the actuating direction raises the at least one drive wheel/roller from the lower to the raised position.

17. The roller drive of claim 16, wherein the lowering mechanism further comprises a cam disk having a groove and a guide pin for guided movement in the groove of the cam disk, wherein the guide pin moves along a closed path between a starting position and a locking position when the pedal is actuated.

18. The roller drive of claim 16, wherein the at least three castors comprise double castors.

19. The roller drive of claim 16, wherein the frame comprises two longitudinal beams and a crosshead bridging the two longitudinal beams.

20. The roller drive of claim 16, comprising two longitudinal beams which are generally parallel with respect to each other, and a crosshead bridging the two beams;
wherein the two longitudinal beams and the crosshead collectively form
a U-shaped profile when viewed from a location elevationally higher than the roller drive.

21. A roller drive according to claim 16, wherein the actuation direction is a downward direction.

* * * * *